Jan. 23, 1951  F. W. SCHWEHR ET AL  2,539,278
ORTHODONTIC APPLIANCE DEMONSTRATING MODEL
Filed April 28, 1949  2 Sheets-Sheet 1

INVENTORS
FRANK W. SCHWEHR
MILTON E. OHRMUNDT
BY
ATTORNEYS

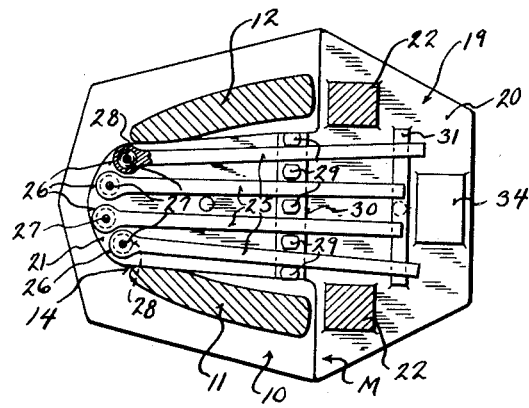

Patented Jan. 23, 1951

2,539,278

UNITED STATES PATENT OFFICE 2,539,278

ORTHODONTIC APPLIANCE DEMONSTRATING MODEL

Frank W. Schwehr and Milton E. Ohrmundt, Milwaukee, Wis.

Application April 28, 1949, Serial No. 90,098

6 Claims. (Cl. 32—71)

This invention appertains broadly to the art of dentistry, and more particularly to a device for demonstrating and studying the action of teeth under certain conditions.

One of the salient objects of this invention is to provide a human or animal model dentition to be used for demonstrating or study in which teeth are movable as a result of forces applied to them, such forces being mechanical, for instance, springs, or by some other appliance, such as teeth restorations, or natural forces, for instance, pressures developed during mastication or pressures developed by tongue and cheek actions.

Another important object of this invention is to provide a dentition or study model in which teeth are moved by mechanical means to represent the eruption, exfoliation, loss by extraction, or the drifting of teeth, or the growth of the jaws or any changes in the dentition normal or abnormal, occurring for any reason, with means for releasing or controlling said mechanical means.

A further important object of the invention is to provide a model of a human dentition in which teeth are movable with releasable means for holding the teeth in various positions from which an orthodontic appliance tends to move them in correct alignment, when said releasable means is operated to permit the orthodontic appliance to function; whereby the study of orthodontia will be effectively aided.

With these and other objects in view, the invention consists in the novel construction, arrangement and formation of parts as will be hereinafter more specifically described and claimed, and illustrated in the accompanying drawing, in which drawing:

Figure 5 is a horizontal sectional view taken on the line 5—5 of Figure 4, looking in the direction of the arrows.

Figure 6 is a transverse sectional view taken on the line 6—6 of Figure 4, looking in the direction of the arrows.

Figure 7 is a similar transverse sectional view, but taken on the line 7—7 of Figure 4, looking in the direction of the arrows.

Figure 8 is an enlarged front elevational view showing one type of orthodontic appliance which can be used with the model.

Figure 9 is a top plan view of the orthodontic appliance, with parts thereof broken away and in section.

Referring to the drawings in detail, wherein similar reference characters designate corresponding parts throughout the several views, the letter M generally indicates a demonstrating or study model of a human dentition embodying the principles of the invention.

Figure 1:
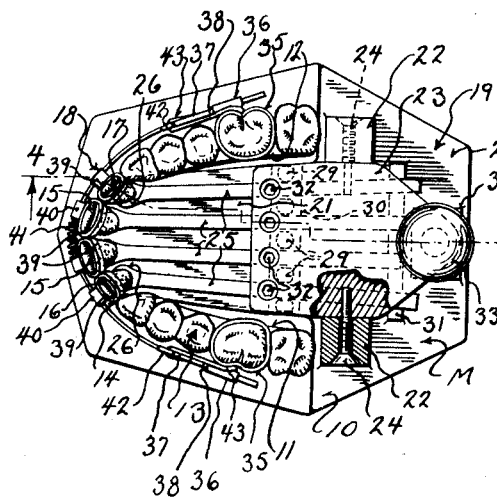
Figure 1 is a top plan view of a human dentition, illustrating one application of the invention, the view showing the movable teeth in their correct or straightened position, parts of the figure being shown broken away and in section.

As illustrated, the model M includes a base or body 10, preferably, formed from a plastic which can be molded to simulate a jaw. In the present instance, the body or base 10 has molded thereon the opposite sides 11 and 12 of a lower jaw and gum of a human being. As illustrated, the opposite sides of the jaw carry the molars, bicuspids and canine teeth indicated by the reference character 13. This leaves an open space 14 at the front of the model, for a purpose which will now appear.

In the space 14 is positioned movable teeth and in the assembly of the invention illustrated, I have shown movable central incisors 15, and movable lateral incisors 16 and 17. Obviously a model can be built with one or more movable teeth.

The model M has been developed to more particularly illustrate the straightening of crooked teeth by an orthodontic appliance and such appliance is generally indicated in the drawings by the reference character 18.

Securely fastened to the upper face of the base or body 10 is a plate 19 preferably formed from polished non-tarnishable metal. This plate 19 includes a rear main portion 20 and a forwardly extending central portion 21, which extends between the side portions 11 and 12 of the jaw and gums. Formed on, or secured to, the main portion 20 of the plate are upstanding pivot lugs 22. These lugs can be arranged directly in rear of the rearmost molars of the model. Rockably mounted intermediate its ends on the pivot lugs 22 is a holding plate lever 23 and this lever extends forwardly of the front portion 21 of the plate 19 between the jaw portions 11 and 12. The pivot lugs 22 can adjustably carry pivot pins 24 which extend into the opposite sides of the lever plate 23 and this lever plate freely rocks on the pins.

The movable teeth 15, 16 and 17 are carried in a novel manner and a movable lever 25 is provided for each tooth. The forward end of each lever terminates in a ball socket 26. Each of the teeth 15, 16 and 17 has rigidly secured thereto a depending pin 27 and the lower end of each pin has rigidly fastened thereto a ball 28. Each ball is received in the ball socket 26 of its corresponding lever 25 and the balls 28 bear against the upper face of the central plate extension 21. The levers 25 extend rearwardly from the teeth between the jaw portions 11 and 12 and under the lever plate 23. The levers can be guided in their movement by upstanding guide lugs 29 formed on a transversely extending rib 30 on the plate 20. The guide lugs 29 limit the lateral shifting of the levers. The extreme rear end of the levers can rest on a transversely extending guide rib 31 so as to prevent the levers from dropping out of a horizontal position.

Under certain conditions the lever plate 23 at its forward end binds against the levers 25 for holding said levers and the teeth 15, 16 and 17 against movement. In order to provide an accurate and firm holding means for the levers, the plate lever 23 adjacent to its forward end carries individually adjustable set screws 32 and these screws bear against the upper faces of the levers 25 under certain conditions.

The extreme rear end of the lever plate carries a set screw 33 and this set screw bears against an anvil portion 34 formed on the plate 20. Obviously, by threading the screw 33 downward, the rear end of the lever plate will be lifted and the forward end of the lever plate will be lowered so that the set screws 32 will firmly contact the levers 25.

The movable teeth 15, 16 and 17 can be actuated to a desired position by certain forces or pressures and in the present illustration of the invention a mechanical device, namely, the orthodontic appliance 18, is employed. This orthodontic appliance 18 tends to move the teeth 15, 16 and 17 to a normal position in correct alignment.

The orthodontic appliance 18 comprises molar bands 35 and these bands are fitted firmly about the selected teeth and carry guide sleeves 36. These sleeves slidably receive the ends of a resilient wire 37. The wire can carry stop shoulders 38 for limiting the sliding movement of the wire in the sleeves 36. The wire normally tends to assume to a straight position as shown in Figures 8 and 9. Slidably mounted on the wire 37 intermediate the ends thereof are bands 39. These bands 39 correspond in number to the movable teeth 15, 16 and 17 and are firmly clamped thereon. These bands 39 also carry sleeves 40 through which the resilient wire 37 is threaded. An expansion coil spring 41 is placed on the wire 37 between certain of the bands 39 and this spring normally tends to move the bands 39 in a preferred direction.

Figure 2:
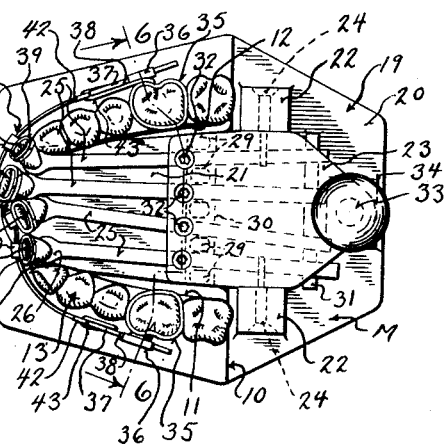
Figure 2 is a similar top plan view of the demonstrating or study model with the movable teeth out of alignment and held in such position by the novel releasing means.
Figure 3:
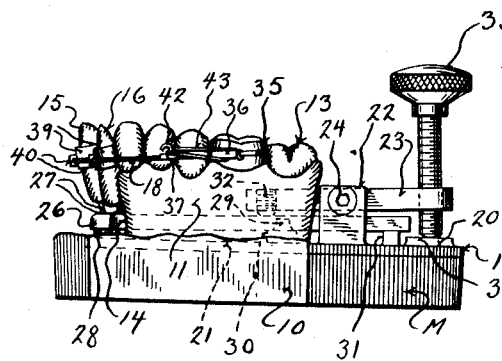
Figure 3 is a side elevational view of the demonstrating or study model with the teeth in correct alignment.
Figure 4:
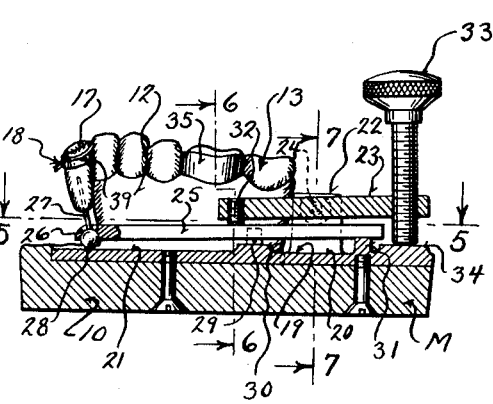
Figure 4 is a longitudinal sectional view taken on the line 4—4 of Figure 1, looking in the direction of the arrows.

The orthodontic appliance 18 is applied in position by flexing the wire 37 against its inherent resiliency as is clearly shown in Figures 1 to 4 inclusive. Hence the wire and the spring tend to move the teeth 15, 16 and 17 into a straight, normal position and maintain them in such position. In order to further aid in this movement, the wire 37 adjacent to its opposite ends can be provided with hooks 42 and resilient members such as rubber bands 43 can be placed in the hooks and around the connecting portions of the sleeves 36 with the bands 35. These springs or rubber bands 43 tend to pull the wire 37 back so that the shoulders 38 on the wire will engage the guide sleeves 36.

In use of the demonstrating or study model M, the set screw, 33, is loosened so that the levers 25 can have free movement. The teeth 15, 16 and 17 are now manually moved back to a crooked position out of alignment and it is to be noted that the teeth are free to turn in the ends of the levers. As the movable teeth 15, 16 and 17 are moved manually back to a crooked position, the same are momentarily held after which the thumb screw 33 is rotated downward so that the forward end of the lever plate 23 with the set screw 32 will bear down on the levers. This will tend to rock the forward ends of the levers 25 down with the balls 28 in binding contact with the central forward portion 21 of the plate 19. Hence not only are the levers 25 held against movement, but the teeth 15, 16 and 17 are held against turning movement on the levers. It is to be noted that the correct orthodontic appliance 18 is used to mechanically move back the certain crooked teeth to their correct aligned position and when the teeth are manually moved back to such position that the resilient wire 37 will be flexed in different directions and this flexing of the wire functions to move back the teeth to their correct aligned position.

Upon the slow releasing of the thumb screw 33 the teeth and the levers will slowly move back to their correct aligned position and this movement can be studied.

While I have illustrated and described one example and use of the invention, obviously, the invention has other uses, such as:

1. A device for demonstrating the forces applied to a tooth or teeth in traumatic occlusion.

2. A device for demonstrating the forces applied to the teeth during occlusion in any type of malocclusion as found in orthodontia.

3. A device for demonstrating the forces applied to a tooth or teeth because of the anatomy of the occlusal or incisal surface or because of its angulation in position.

4. For demonstrating the forces applied to the occluding members of a partial denture or fixed bridge restoration.

5. For demonstrating the forces applied to the teeth in normal occlusion.

6. For demonstrating the forces applied by the clasps or other members of a partial denture or of fixed bridge to the teeth supporting such restoration.

7. For demonstrating the effect of forces applied by an orthodontic appliance in the correction of a malocclusion.

8. For demonstrating the effect of forces applied by thumbsucking or other habits.

9. For demonstrating the forces applied to the teeth by muscles in and around the oral cavity as the cheeks, tongue and lips.

10. For demonstrating that the movement of the mandible in mastication is controlled by the arrangement of the teeth.

Changes in details may be made without departing from the spirit or the scope of this invention, but what we claim as new is:

1. A model for demonstrating the straightening of teeth comprising a body shaped to simulate the appearance of a jaw, stationary teeth for the jaw and movable teeth for the jaw, an orthodontic appliance tending to move the movable teeth to a correct position in alignment and releasable means for holding the teeth out of alignment against the action of said orthodontic appliance.

2. A model for demonstrating the straightening of teeth comprising a body shaped to simulate a jaw, stationary teeth for said jaw and movable teeth for said jaw, levers on said body, means swivelly connecting the movable teeth to the levers whereby said teeth are free to turn on said levers, an orthodontic appliance normally tending to move the movable teeth to a correct aligned position, means for holding the levers and the teeth against movement with the teeth in a crooked condition so that they cannot be moved by said orthodontic appliance and means for slowly releasing said holding means.

3. A demonstrating and study model comprising a body shaped to simulate a jaw, stationary teeth for said jaw and movable teeth for said jaw, a lever for each movable tooth, a ball and socket connection between each tooth and its lever, an orthodontic appliance anchored to certain of the immovable teeth and connected to said movable teeth for normally urging the movable teeth to a position in correct alignment, a pressure plate, means for moving the pressure plate into engagement with the levers for holding the levers and the teeth in a crooked position against the action of the orthodontic appliance and for slowly releasing the pressure of the plate on the levers.

4. A study and demonstrating model comprising a body shaped to simulate a jaw, rigid teeth for said jaw and movable teeth for said jaw, longitudinally extending levers mounted for movement on the body, a ball and socket connection between the levers and the movable teeth, the ball portions being carried by the movable teeth and engaging the body, a pressure plate for the levers, and means for moving the pressure plate into contact with the levers for holding the balls in tight contact with the body and for releasing the pressure plate from the levers, and means normally tending to move the movable teeth in a correct aligned position relative to one another and the rigid teeth.

5. A study and demonstrating model comprising a body shaped to simulate a jaw, stationary teeth and movable teeth for the jaw, longitudinally extending levers, said levers and teeth having a ball and socket connection, with the ball portions carried by the teeth and bearing against the body, a pressure plate rockably mounted intermediate its ends on the body above the levers, means normally tending to move the teeth and levers to a selected position, and means for holding the levers and teeth against movement including said pressure plate and an adjustable member for rocking said pressure plate against said levers with the balls in contact with the body.

6. A study and demonstrating model comprising a body shaped to simulate a jaw, stationary teeth and movable teeth for the jaw, longitudinally extending levers, said levers and teeth having a ball and socket connection, with the ball portions carried by the teeth and bearing against the body, a pressure plate rockably mounted intermediate its ends on the body above the levers, means normally tending to move the teeth and levers to a selected position, means for holding the levers and teeth against movement including said pressure plate, an adjustable member for rocking said pressure plate against said levers with the balls in contact with the body, and adjustable members carried by the pressure plate movable toward and away from the levers.

FRANK W. SCHWEHR.
MILTON E. OHRMUNDT.

REFERENCES CITED

The following references are of record in the file of this patent:

UNITED STATES PATENTS

| Number | Name | Date |
|---|---|---|
| 1,102,390 | Dalton | July 7, 1914 |
| 2,333,795 | Kellerman et al. | Nov. 9, 1943 |